United States Patent [19]
Oak

[11] Patent Number: 5,909,807
[45] Date of Patent: Jun. 8, 1999

[54] MULTI-PURPOSE VIDEO CASSETTE CASE

[76] Inventor: Eugene Oak, 3550 Wilshire Blvd., Suite 1410, Los Angeles, Calif. 90010

[21] Appl. No.: 09/075,891

[22] Filed: May 11, 1998

[51] Int. Cl.[6] .................................................. B65D 85/672
[52] U.S. Cl. ................................ 206/387.13; 206/387.14
[58] Field of Search ........................... 206/387.1, 387.13, 206/387.14, 232, 472, 473, 814

[56] References Cited

U.S. PATENT DOCUMENTS 4,838,420  6/1989  Collett et al. ...................... 206/387.1
5,772,028  6/1998  Massilio et al. ................... 206/387.13

*Primary Examiner*—Jacob K. Ackun

[57] ABSTRACT

A multi-purpose video cassette case for a single video cassette including a case defining an interior space to receive a video cassette, wherein the interior space may be divided by several partitioning members which divide the interior space into several smaller interior spaces. In this manner, the case can accommodate a number of other articles, including audio cassette tapes and greeting cards.

8 Claims, 4 Drawing Sheets

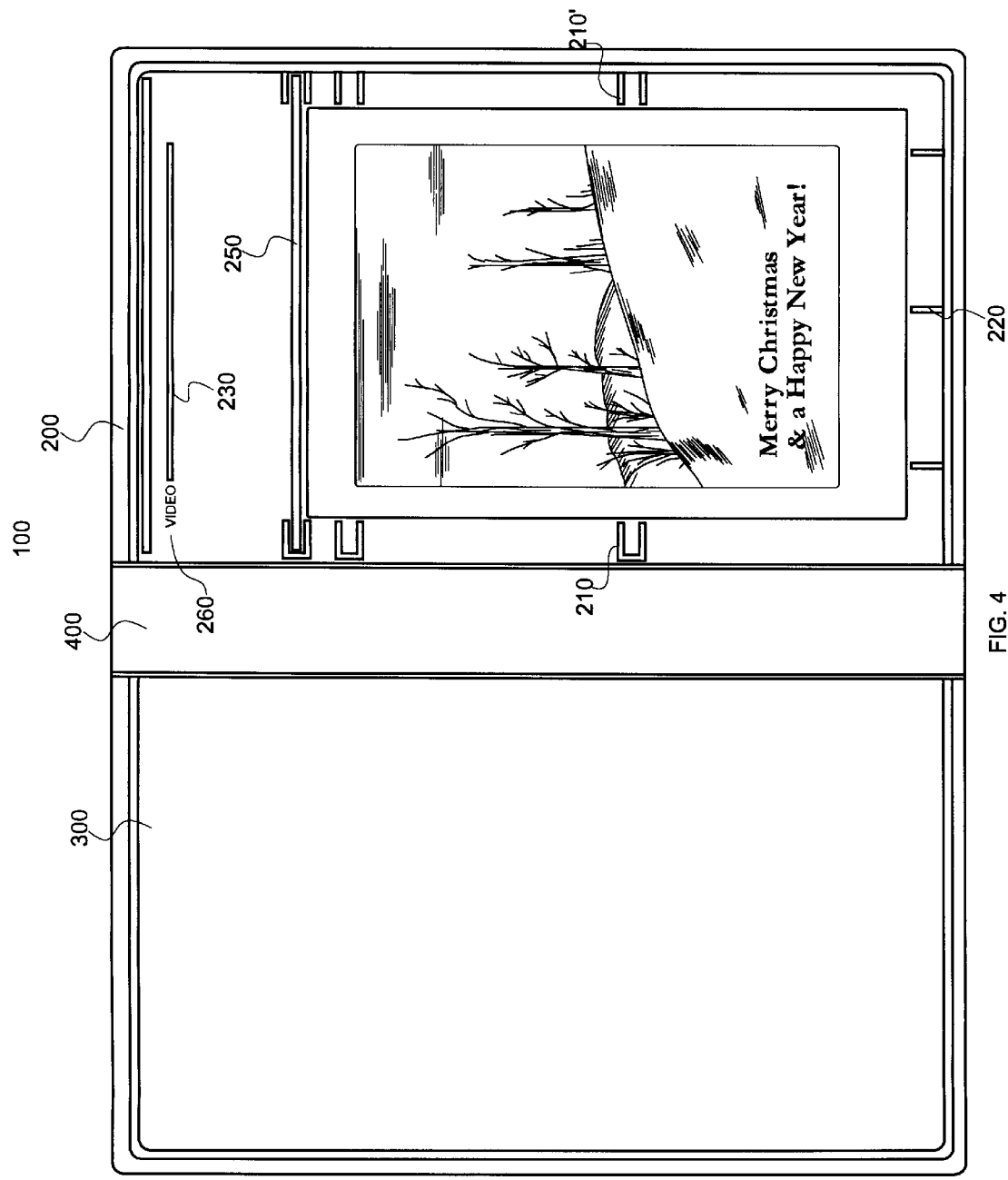

MULTI-PURPOSE VIDEO CASSETTE CASE

BACKGROUND OF THE INVENTION

1. Field of the Invention

The present invention relates generally to the field of multi-purpose cases and organizers, and particularly to multi-purpose cases which accommodate a variety of articles.

2. Description of the Prior Art

Carrying cases have been developed for articles such as video cassettes, audio cassette tapes and greeting cards that have become industry standards. Video cassettes are typically stored in book-like folding containers which encase cassettes and protect them from moisture and dust. These folding containers are typically made of flexible plastic. Video cassettes are also often sold in flimsy cardboard boxes bearing descriptive pictures and text about the contents of the video cassette, and consumers usually use these boxes as storage containers for the video cassette, although they do not afford very much protection from moisture and dust.

Audio cassette tapes are similarly stored in book-like containers made of rigid plastic. Often, audio cassette tape containers additionally contain printed matter bearing pictoral and textual descriptive matter about the contents recorded on the tape.

Greeting cards are often sold and stored in small cardboard boxes having transparent covers so that consumers may view the style of the cards contained within the box.

Although the containers which have been developed to store and protect each of the above articles are effective in containing their respective articles, they are ineffective in serving as containers for other articles. For example, video cassette containers serve as poor audio cassette tape containers, and greeting card boxes do not serve well as video cassette containers. There is currently a need for containers which may accommodate a plurality of different types of articles, namely, the articles mentioned above.

Consequently, the primary object of the present invention is to provide a multi-purpose video cassette case that can accommodate video cassettes, audio cassette tapes, and greeting cards.

Another object of the present invention is to provide a multi-purpose video cassette case that is relatively inexpensive to manufacture.

SUMMARY OF THE INVENTION

The present invention is a multi-purpose video cassette case which also has means for accommodating audio cassette cases and greeting cards. The present invention comprises a housing wherein the various aforementioned articles may be accommodated. The housing further comprises a plurality of repositionable dividing partitions which are secured within the housing by utilizing a retaining means. The retaining means are a plurality of pairs of brackets that are provided within the housing, each pair of brackets essentially positioned to divide the interior space within the housing to securely accommodate a particular article.

These together with other objects of the invention are explained clearly in the claims annexed to and forming a part of this disclosure. For a better understanding of the invention, its operating advantages and the specific objects attained by its use, reference should be made to the accompanying drawings in which there are illustrated preferred embodiments of the invention.

BRIEF DESCRIPTION OF THE DRAWINGS

For a better understanding of the principle and nature of the present invention, reference should be made to the following detailed description taken in connection with the accompanying drawings in which:

FIG. 4 is a top view of the present invention depicting two repositionable dividing partitions positioned in a manner that allows the present invention to accommodate two audio cassette tapes.

DETAILED DESCRIPTION OF THE PREFERRED EMBODIMENT

Figure 1:
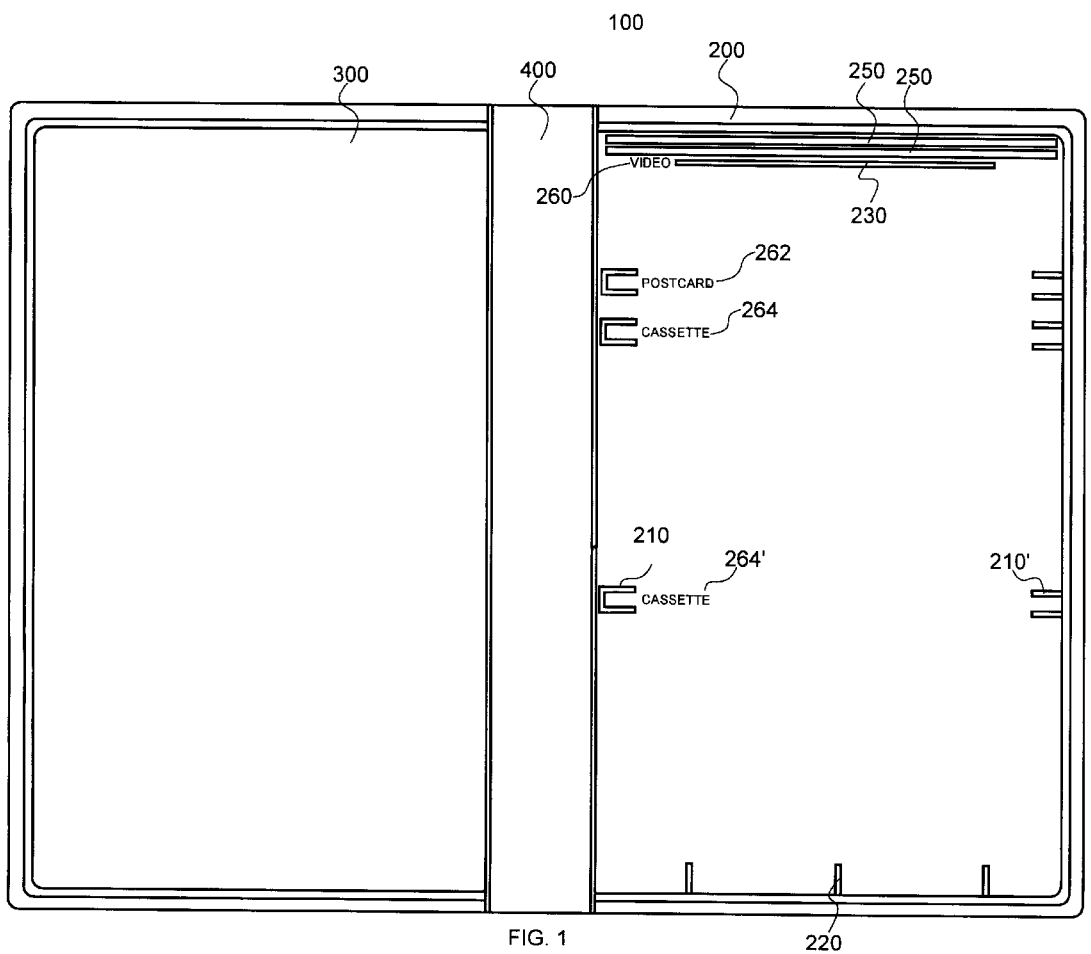
FIG. 1 is a top view of the present invention depicting the repositionable dividing partitions in a storage area.
Figure 2:
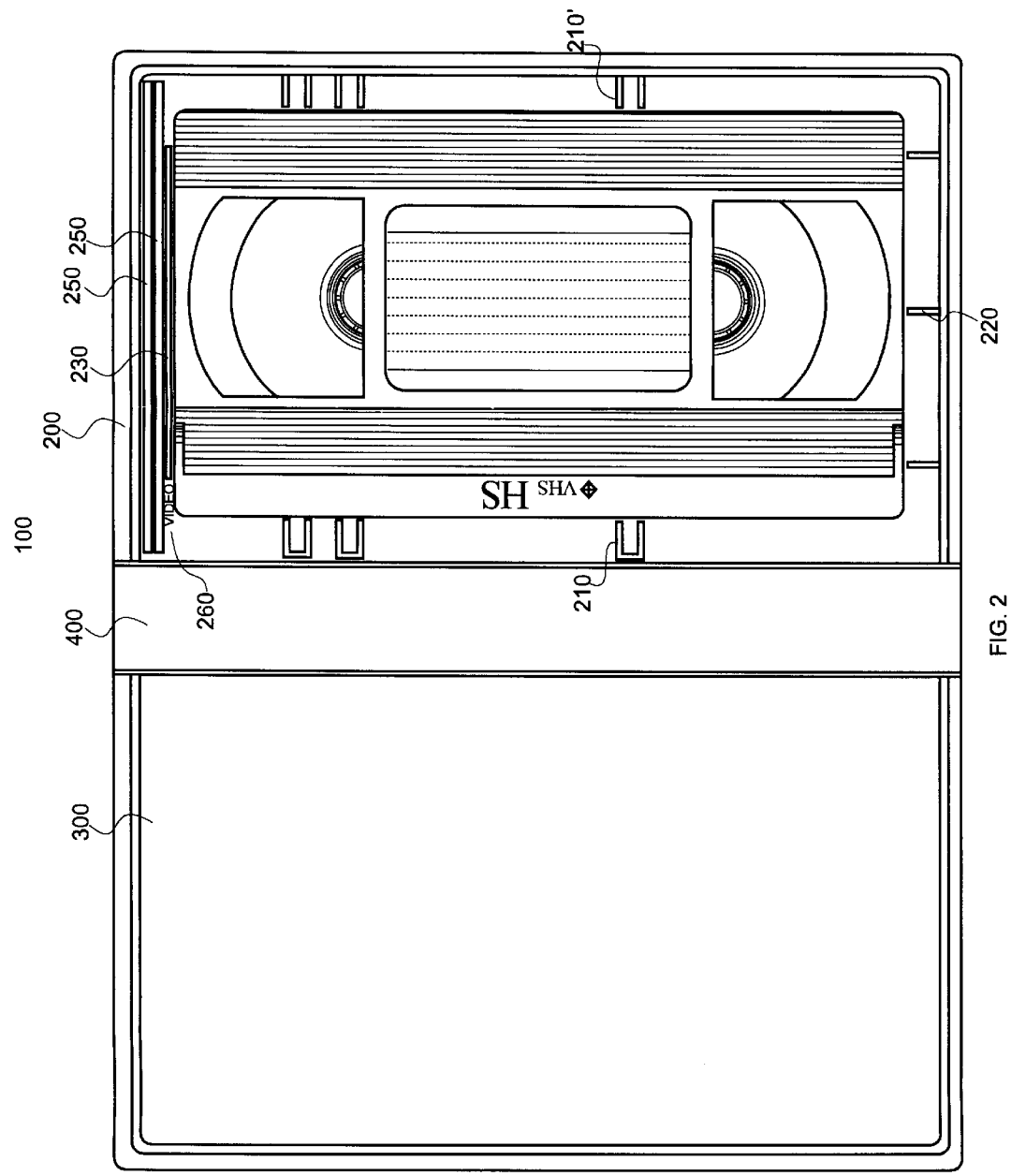
FIG. 2 is a top view of the present invention depicting a repositionable dividing partition positioned in a manner that allows the present invention to accommodate a video cassette.

Referring to FIG. 1, the present invention comprises a housing 100 which further comprises a case 200 having a lid 300 secured thereto by a hinge 400. The case 200 defines an interior space 205 within which articles are inserted into and removed from. Referring to FIG. 2, the case 200 is of a size which snugly accommodates a video cassette 500.

Figure 3:
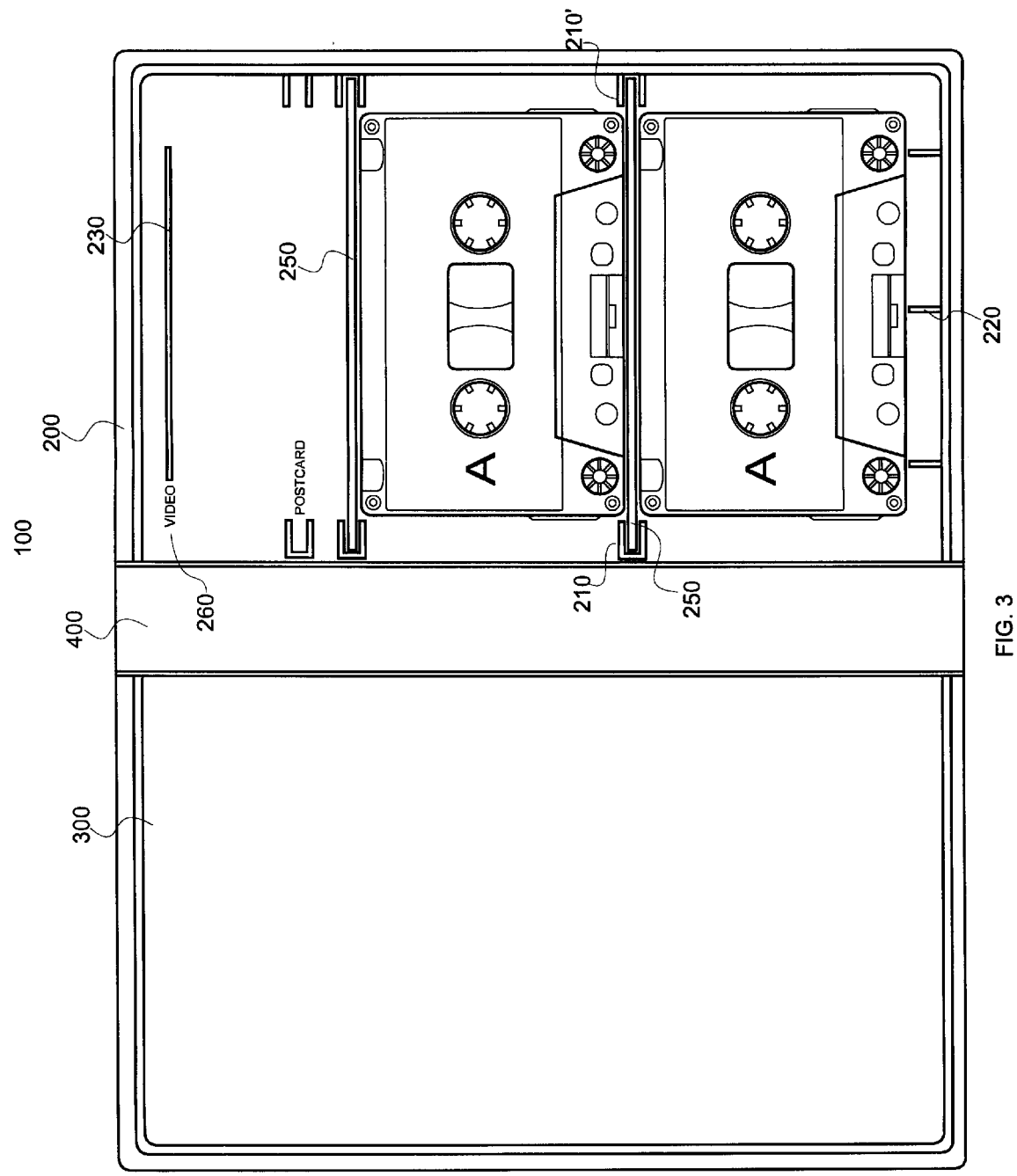
FIG. 3 is a top view of the present invention depicting a repositionable dividing partition positioned in a manner that allows the present invention to accommodate a plurality of greeting cards.

Referring to FIG. 2, FIG. 3, and FIG. 4, the interior space 205 of the case 200 may accommodate a video cassette 500, two audio cassette tapes 600 and 600', or a plurality of greeting cards 700 by means of partitioning the interior space 205 within the case 200 by positioning a partitioning member 250 or two partition members 250 and 250' to accommodate any of the aforementioned articles. Each partitioning member 250 is retained in place by a pair of retaining means 210 and 210', each retaining means 210 and 210' securing an end of the partitioning member 250.

Referring to FIG. 2, a video cassette 500 is accommodated inside the interior space 205 within the case 200 without the use of partitioning member 250. The video cassette 500 fits securely between the retaining means 210 and 210' and a plurality of additional supporting structures 220 without the use of partitioning member 250. The two partitioning members 250 and 250' are securely stored in-between the case 200 and an upper partition 230 when not in use.

Referring to FIG. 3, two partitioning members 250 and 250' are positioned within the interior space 205 of the case 200 in order to provide two accommodating spaces for two audio cassette tapes 600 and 600'. A pair of retaining means 210 and 210' are used to hold each partition member 250 and 250' in place. A plurality of additional supporting structures 220 may be utilized to form a more secure space for the audio cassette tapes 600 and 600'.

Referring to FIG. 4, a partition member 250 is positioned within the interior space 205 of the case 200 in order to provide an accommodating space for a plurality of greeting cards 700 in a vertically oriented pile. A pair of retaining means 210 and 210' is utilized to secure the partition member 250 in place. Because greeting cards are provided in various shapes and sizes, the case 200 may be manufactured with a pair of retaining means 210 and 210' attached to the case 200 at different positions to accommodate various sizes of greeting cards. Several different pairs of retaining means 210 and 210' may also be attached to the case 200 so that the same case 200 may be able to accommodate greeting cards of varying shapes and sizes.

Referring to FIG. 1, instructional guidelines 260, 262, 264, and 264' may be printed adjacent to the retaining means 210 and 210' to inform the user where to position a partitioning member 250 to accommodate a particular article. The instructional guidelines may be in the form of the words "VIDEO" 260, "POSTCARD" 262, "CASSETTE" 264, and "CASSETTE" 264'.

Referring to FIG. 1, FIG. 2, FIG. 3, and FIG. 4, in a preferred embodiment of the present invention, each of the retaining means 210 and 210' of the present invention are brackets where each of the partitioning members 250 are accommodated therebetween. The partitioning members 250 may be inserted into and removed from the brackets and repositioned as the user sees fit.

In addition, video cassettes are often sold in flimsy cardboard boxes which are easily damaged and which afford little protection to the video cassette from moisture, dust, and impact. Yet, these cardboard boxes often bear important information or descriptive matter regarding the contents recorded on the video cassette, and thus are not immediately discarded in favor of better forms of protection for the video cassette. Until now, users had to either store the video cassette in the flimsy cardboard box or store the video cassette in a more substantial protective covering and store the cardboard box elsewhere. In an alternate embodiment of the present invention, the case 200 of the invention is slightly enlarged to snugly receive a video cassette with the cardboard box covering the video cassette.

Other articles may be accommodated by positioning the retaining means 210 and 210' within the interior space 205 to accommodate those articles, and the inclusion of greeting cards and audio cassette tapes are not meant to be construed as reason for exclusion of other articles. The figures depict the partitioning members 250 dividing the interior space 205 across the width of the case 200. However, partitioning members 250 and corresponding retaining members 210 and 210' may also be utilized in a lengthwise orientation.

What is claimed as being new and therefore desired to be protected by Letters Patent of the United States is as follows:

1. A cassette case for a single video cassette of the type including a case defining an interior space dimensioned to snugly receive a video cassette and a lid hingedly secured to said case for movement between an open position wherein said lid exposes said interior space of said case to accommodate insertion and removal of a video cassette, and a closed position wherein said lid overlies said case for enclosing said interior space, the improvement comprising a plurality of partitioning members and means for securing said plurality of partitioning members within said case, said partitioning members when employed effectively dividing said interior space into a plurality of smaller interior spaces.

2. A cassette case for a single video cassette as mentioned in claim 1, wherein some of said plurality of smaller interior spaces accommodate audio cassette tapes.

3. A cassette case for a single video cassette as mentioned in claim 1, wherein one of said plurality of smaller interior spaces accommodates a plurality of greeting cards arranged in a vertically oriented pile.

4. A cassette case for a single video cassette as mentioned in claim 1, wherein a separate space is provided to accommodate said plurality of partitioning members when a video cassette is received in said interior space of said case.

5. A cassette case for a single video cassette of the type including a case defining an interior space dimensioned to snugly receive a video cassette and a lid hingedly secured to said case for movement between an open position wherein said lid exposes said interior space of said case to accommodate insertion and removal of a video cassette, and a closed position wherein said lid overlies said case for enclosing said interior space, the improvement comprising a plurality of partitioning members and means for securing said plurality of partitioning members within said case, said partitioning members when employed effectively dividing said interior space into a plurality of smaller interior spaces, wherein said means for securing said plurality of partitioning members comprises a plurality of brackets, a dividing partition inserted in-between two brackets in order to secure said partitioning member in a particular position within said case.

6. A cassette case for a single video cassette as mentioned in claim 5, wherein some of said plurality of smaller interior spaces accommodate audio cassette tapes.

7. A cassette case for a single video cassette as mentioned in claim 5, wherein one of said plurality of smaller interior spaces accommodates a plurality of greeting cards arranged in a vertically oriented pile.

8. A cassette case for a single video cassette as mentioned in claim 5, wherein a separate space is provided to accommodate said plurality of partitioning members when a video cassette is received in said interior space of said case.

* * * * *